United States Patent [19]

Blythe et al.

[11] Patent Number: 4,731,946
[45] Date of Patent: Mar. 22, 1988

[54] BITE INDICATORS

[75] Inventors: Donald J. Blythe, Canterbury; Frank E. J. Sams, Margate, both of United Kingdom

[73] Assignee: Dellareed Limited, Kent, England

[21] Appl. No.: 706,044

[22] Filed: Feb. 27, 1985

[30] Foreign Application Priority Data

Feb. 29, 1984 [GB] United Kingdom ............. 8405209

[51] Int. Cl.⁴ .............................................. A01K 97/12
[52] U.S. Cl. ........................................................ 43/17
[58] Field of Search ...................... 43/17, 16, 15, 21.2; 73/DIG. 4; 33/DIG. 13

[56] References Cited

U.S. PATENT DOCUMENTS

| 3,453,767 | 7/1969 | Lake | 43/17 |
| 4,051,616 | 10/1977 | Mathauser | 43/17 |
| 4,240,221 | 12/1980 | Komarnicki | 43/17 |
| 4,276,711 | 7/1981 | Mathauser | 43/17 |
| 4,464,419 | 8/1984 | Horn | 33/DIG. 13 |
| 4,466,211 | 8/1984 | Mathauser | 43/17 |

FOREIGN PATENT DOCUMENTS

| 248643 | 5/1963 | Australia | 43/17 |
| 1091037 | 4/1955 | France | 43/17 |
| A551135 | 7/1974 | Switzerland . | |
| 660189 | 10/1951 | United Kingdom | 73/DIG. 4 |
| 637843 | 12/1957 | United Kingdom . | |
| 1127455 | 9/1968 | United Kingdom . | |
| 1398236 | 6/1975 | United Kingdom . | |
| 1596260 | 8/1981 | United Kingdom | 43/17 |
| A2009571 | 1/1982 | United Kingdom . | |

Primary Examiner—Gene P. Crosby
Attorney, Agent, or Firm—McAulay, Fields, Fisher, Goldstein & Nissen

[57] ABSTRACT

A bite indicator for use when fishing with a fishing rod. The indicator comprises a strain sensing element mounted to a support and electrically connected to an indicator. In one embodiment the support comprises a fishing rod support whereas in another embodiment it comprises the wall of the fishing rod. In both cases, movement of the fishing rod when a bite occurs is sensed by the sensing element and thereby actuates the indicator.

6 Claims, 6 Drawing Figures

BITE INDICATORS

BACKGROUND OF THE INVENTION

The present invention relates to bite indicators for use when fishing with a fishing rod.

SUMMARY OF THE INVENTION

According to the invention there is provided a bite indicator comprising a strain sensing element mounted to support means and electrically connected to indicating means, the arrangement being such that, in use, movement of a fishing rod when a bite occurs is sensed by the sensing element and actuates the indicating means.

In a preferred embodiment of the present invention, the sensing element is constituted by a piezoelectric device or a silicon strain gauge.

In one embodiment of the invention the sensing element is attached to a fishing rod support which is caused to flex by movement of the rod upon the occurrence of a bite.

In a further embodiment the sensing element is provided for attachment to the fishing rod itself. When the rod is of tubular form the sensing element may be located within the rod attached to its inner surface. The sensing element and thin connecting wires therefor may be mounted into the rod during manufacture.

The sensing element may be connected with a bridge rectifier so that movement of the support means will actuate the indicating means.

The output from the bridge rectifier may be connected to a squarer and delay circuit to give an output pulse of predetermined duration to actuate the indicating means.

The output from the squarer and delay circuit may be connected via a buffer amplifier to operate visual indicating means such as a light emissive diode.

Said sensing element and associated electrical components may be located in a first housing, which comprises said support means, and electrical supply leads therefor are connected to one half of a plug socket connector, the other half of which is located in a second housing arranged to contain a battery. The output from the buffer amplifier may be connected via a further buffer amplifier and the plug and socket connector to an oscillator and still further buffer amplifier to actuate an audible indicator all located in the second housing. The audible indicator may comprise a tone sounder.

A plurality of first housings may be connected via a plurality of plug and socket connectors to a single second housing.

The or each said first housing may be attached to, or formed integrally with, a plate form member, with a slot therein which opens into a V-shaped formation for locating a fishing rod therein in use.

BRIEF DESCRIPTION OF THE DRAWINGS

Embodiments of the present invention will now be described, by way of example, with reference to the accompanying drawings, in which.

DESCRIPTION OF PREFERRED EMBODIMENTS

Figure 1:
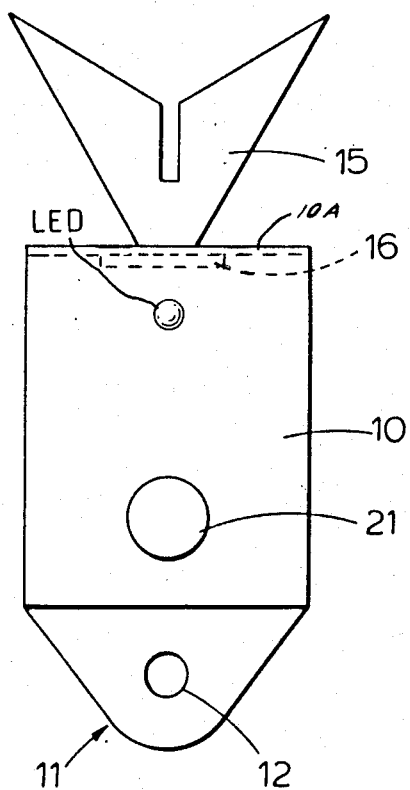
FIG. 1 is a front elevational view of an embodiment of a bite indicator according to the present invention.
Figure 2:
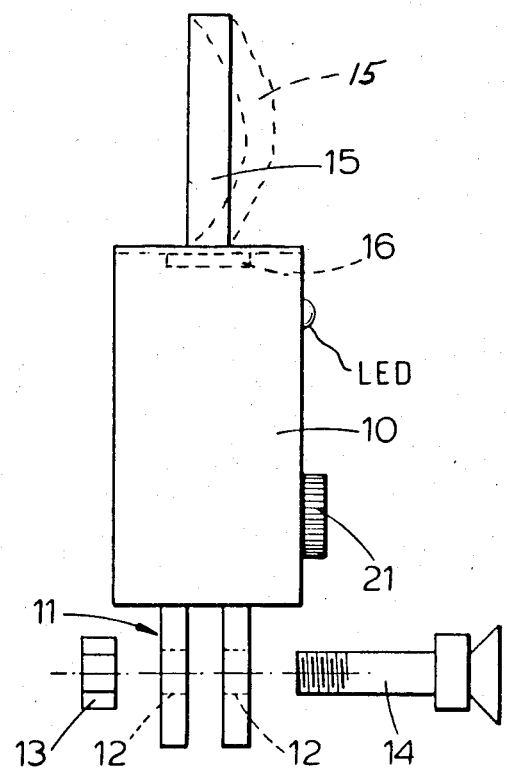
FIG. 2 is a side elevational view of the bite indicator of FIG. 1.

FIGS. 1 and 2 show a bite indicator comprising a housing 10 located on a pair of brackets 11 having apertures 12 which, in use, cooperate with a nut 13 and bolt 14 for attaching the device to a bank stick. A V-shaped member 15 is provided on the top surface 10a of housing 10 and a sensing element 16 in the form of a conventional piezoelectric element or silicon strain gauge element, is located on the inner surface of the top 10a of the housing 10.

In use, a fishing rod is located in the V-shaped member 15 so that movement of the rod due to a bite causes flexure of member 15 and of the top of housing 10. Such movement is sensed by element 16 and an indication given as will be hereinafter described.

Figure 3:
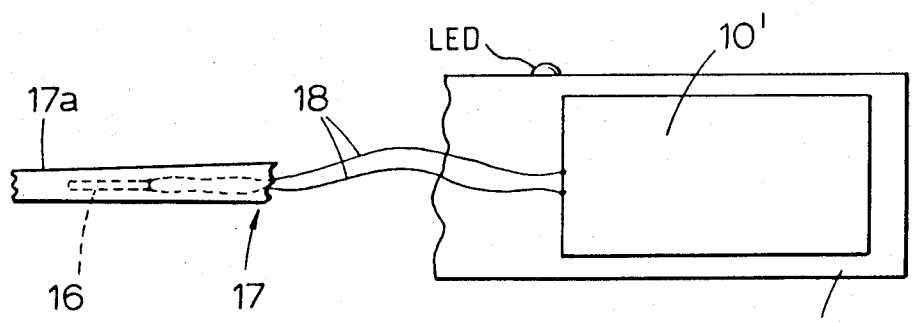
FIG. 3 is a schematic diagram of a fishing rod with a bite indicator of a further embodiment of the invention located therein.

FIG. 3 shows an alternative embodiment in which the sensing element 16 is located on the inner surface of a tubular rod 17 adjacent the tip 17a thereof. Connecting wires 18 connect the element 16 to housing 10', located in the butt of the rod, and containing an indicating circuit.

In this embodiment, flexure of the tip of the rod 17 due to a bite will be sensed by element 16 to provide an indication thereof. The element 16 may be a multimorph or bimorph strip and the element 16 and wires 18 could be formed into the rod 17 during manufacture.

Figure 4:
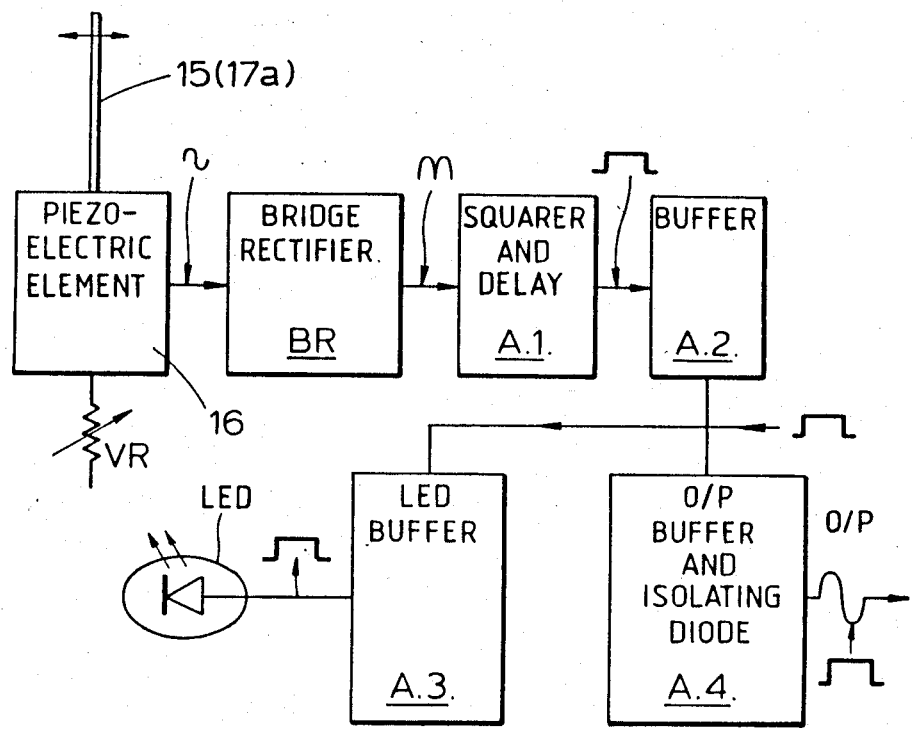
FIG. 4 is a block circuit diagram of the bite indicator of FIGS. 1, 2 and 3.

Referring now to FIG. 4, the sensing element 16 has a variable resistor VR connected thereto which is controlled by a knob 21 outside housing 10, 10'. The variable resistor VR can be adjusted, in use, to vary the sensitivity of the device. The bite indicator can be used for fishing in calm or still waters when any movement of the rod is required to actuate the device. Alternatively, the indicator can be used in running water or the sea when steady movement thereof will move the rod to a stable position. The occurrence of a bite may tighten or slacken the line according to the direction of movement of the fish relative to the direction of movement of the water being fished. However, either such movement will cause a sudden and positive movement of the rod to give a sensible output from device 16.

The element 16 is connected to a bridge rectifier BR so that either direction of movement of the rod will give the same voltage output to a squarer and delay device A1. Device A1 is provided to produce a predetermined duration square wave output irrespective of the length of the output pulse from bridge BR. The output from device A1 is connected via a buffer amplifier A2 to illuminate a light emissive diode LED via a further buffer amplifier A3. The diode LED is mounted on housing 10 or rod 17 (FIG. 3). A further output buffer with isolating diode A4 is also connected to the output of buffer amplifier A2 to provide an external signal output.

Figure 6:
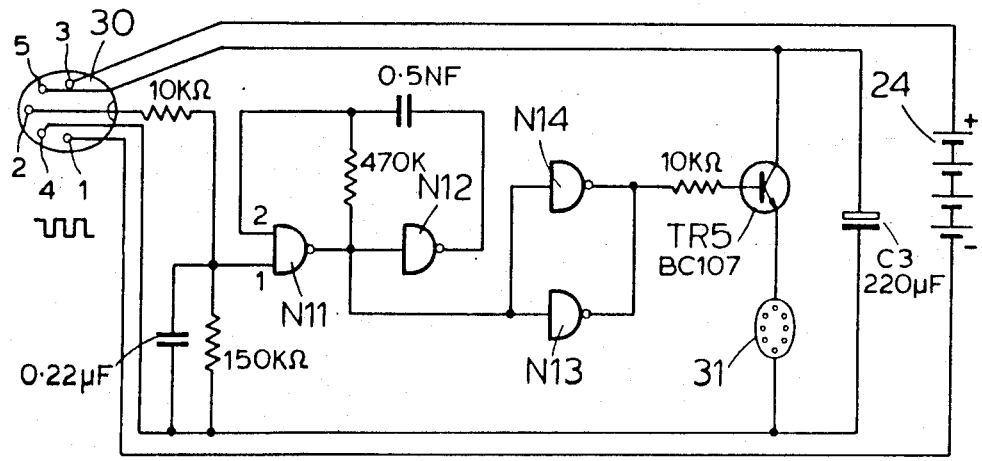
FIG. 6 is a circuit diagram of a audible alarm connectable with the circuit shown in FIG. 5.
Figure 5:
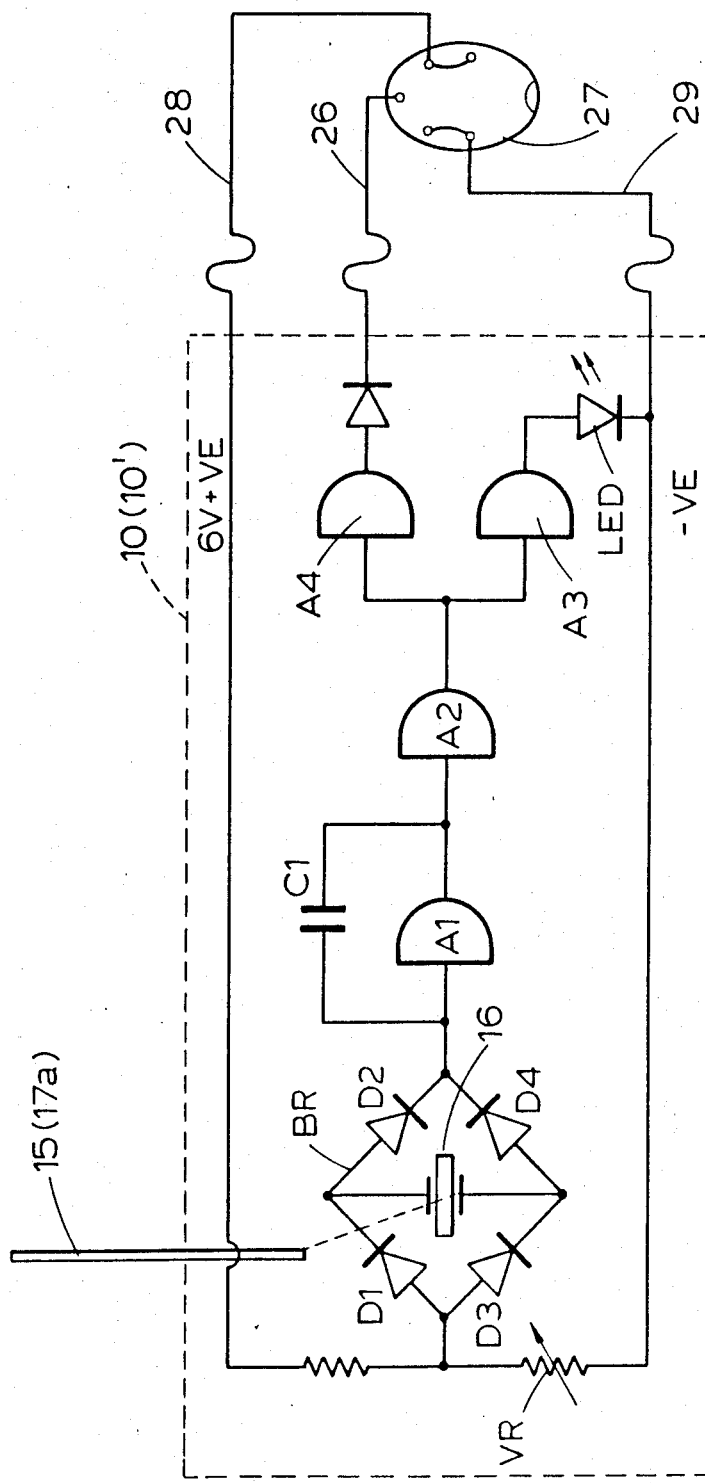
FIG. 5 is a circuit diagram for the bite indicator of FIGS. 1, 2 and 3.

FIG. 5 illustrates a circuit diagram for the block diagram FIG. 4. It will be appreciated that, in relation to the embodiment of FIG. 3, the sensing element shown in FIG. 5, is not, in fact, located in housing 10'. External leads 26, 28 and 29 are connected from the components housed in housing 10, 10' to the plug 27 of a plug and socket connector. Such plug may be connected to the socket 30 as shown in FIG. 6 which is identical with that described in relation to FIG. 5 of our United Kingdom Patent specification No. 1,503,596 so as to provide power for the circuit of FIG. 5 and to provide an audible indication of a bite. Two units as illustrated by the present FIGS. 1 and 2, 4 and 5 or rods as illustrated by FIGS. 3, 4 and 5 can be connected to one such supply and audible alarm device. Alternatively, a device as described in relation to FIG. 4 of our above mentioned G.B. Pat. No. 1,503,596 can be used in conjunction with the unit of the present FIGS. 1, 2, 4 and 5 and with the rod of FIGS. 3 to 5, both connected to a supply and audible alarm device such as shown in the present FIG. 6.

Alternative arrangements (not shown) are adapted so that battery can be housed in housing 10, 10' to supply the circuit contained therein. This permits the production of a unit/rod having a self contained bite indicator.

In further embodiments of the present invention the indicator circuit housed within housing 10, 10' is self contained and consists of the circuit shown in the present FIGS. 5 and 6. Naturally, such a circuit would not require the plug and socket connector 27, 30.

Although in the embodiment described in relation to FIG. 3, the sensing element 16 is located adjacent the rod tip, it can, in fact, be located anywhere along the length of the rod. Indeed, this sensing element may be conveniently located in/on the butt of the rod, where it senses vibrations conducted through the rod on the occurrence of a bite.

Hence a bite indicator has been described which can be used when ledgering in running water or the sea or which can be used with still water.

What we claim is:

1. A bite indicator comprising a flexible fishing rod support fixedly mounted on a housing so that said support and said housing move as a unit; a strain sensing element responsive to the flexure of said rod support and electrically connected to indicating means, the arrangement being such that, in use, when a bite occurs, movement of a fishing rod supported by the rod support causes flexure of said rod support which is sensed by the sensing element and thereby actuates the indicating means.

2. A bite indicator comprising a housing, a fishing rod support means for supporting a fishing rod, which support means is fixedly connected to said housing so that said support means and said housing move as a unit in response to movement of the fishing rod due to a bite, indicating means for indicating a bite, and sensing means connected to said indicating means and responsive to the movement of said support means for actuating said indicating means.

3. A bite indicator according to claim 2, wherein the sensing element is a piezoelectric device.

4. A bite indicator according to claim 2, wherein the sensing element is a silicon strain gauge.

5. A bite indicator comprising a housing, a fishing rod support means for supporting a fishing rod, which support means is fixedly mounted on said housing and is operable to move in response to movement of the fishing rod due to a bite, indicating means for indicating a bite, and sensing means connected to said indicating means and responsive to the movement of said support means for actuating said indicating means, said housing including at least a housing wall, said fishing rod support being mounted on the outer surface of said housing wall, and said sensing means is mounted on the inner surface of said housing wall.

6. A bite indicator according to claim 5, further comprising a further housing for containing a battery and means for electrically connecting said indicator means with said battery.

* * * * *